United States Patent [19]

Haze

[11] Patent Number: 4,535,857

[45] Date of Patent: Aug. 20, 1985

[54] SPAN ADJUSTING METHOD AND APPARATUS

[75] Inventor: Setsuo Haze, Shiga, Japan

[73] Assignee: Kabushiki Kaisha Ishida Koki Seisakusho, Kyoto, Japan

[21] Appl. No.: 605,375

[22] Filed: Apr. 27, 1984

[30] Foreign Application Priority Data

Apr. 28, 1983 [JP] Japan .................................. 58-075445

[51] Int. Cl.³ .................... G01G 19/52; G01G 19/22; G01G 23/14; G01L 25/00
[52] U.S. Cl. ........................................ 177/50; 177/25; 177/164; 177/DIG. 3; 73/1 B; 364/567; 364/571
[58] Field of Search .................. 364/567, 571; 177/25, 177/50, 164, 1, DIG. 3; 73/1 B

[56] References Cited

U.S. PATENT DOCUMENTS

| | | | |
|---|---|---|---|
| 3,887,797 | 6/1975 | Nishiguchi | 364/567 |
| 3,916,173 | 10/1975 | Williams, Jr. et al. | 364/571 X |
| 4,063,447 | 12/1977 | Mathison | 364/571 X |
| 4,080,657 | 3/1978 | Caldicott et al. | 364/571 X |
| 4,139,892 | 2/1979 | Gudea et al. | 364/571 X |
| 4,192,005 | 3/1980 | Kurtz | 364/571 |
| 4,248,316 | 2/1981 | Strobel et al. | 364/567 X |
| 4,316,518 | 2/1982 | Jonath | 177/25 |
| 4,417,631 | 11/1983 | Johnson | 364/567 X |
| 4,467,881 | 8/1984 | Kitagawa | 177/50 |

*Primary Examiner*—George H. Miller, Jr.
*Attorney, Agent, or Firm*—Staas & Halsey

[57] ABSTRACT

A span adjustment method includes applying a known load to a weighing machine and converting an output value from the weighing machine into a digital value by using an analog-to-digital converter. The characteristic of the analog-to-digital converter is sequentially varied automatically by a span adjustment value, which is produced as an output by a control unit, so that the digital value resulting from the analog-to-digital conversion becomes a digital value set in the control unit and conforming to the known load.

10 Claims, 7 Drawing Figures

SPAN ADJUSTING METHOD AND APPARATUS

CROSS-REFERENCE TO RELATED APPLICATION

This application is related to U.S. application Ser. No. 605,376 filed Apr. 27, 1984.

BACKGROUND OF THE INVENTION

This invention relates to a span adjusting method and apparatus for applying a known load to a weighing machine, subjecting the value of an output signal from the weighing machine to an analog-to-digital, or AD, conversion, and effecting an adjustment in such a manner that the digital value resulting from the AD conversion is rendered into a digital value conforming to the applied load.

The span adjustment mentioned above will now be described in greater detail. Assume that a digital value commensurate with a load of 100 g is determined beforehand to be "1000", and that the AD-converted output signal from an as yet unadjusted weighing machine, to which the load of 100 g has actually been applied, is a value of "1010". In such a case it is necessary to effect an adjustment so that the digital output value is brought from "1010" to the desired value of "1000". This adjustment is referred to as a span adjustment.

A weighing machine employed in a combinatorial weighing system or the like includes a weight sensor and a weighing hopper, the former comprising a load cell. Articles introduced into the weighing hopper are weighed by the weight sensor, which has an output which is indicative of the measured weight, and which is applied to a computerized combinatorial control unit through an amplifier an AD converter. The combinatorial control unit is operable to form combinations of weight values obtained from a plurality of the aforementioned weighing machines constituting the combinatorial weighing system, to calculate the total weight of each combination, to obtain a combination (referred to as an "optimum combination"), whose total weight value is equal to a target weight value or closest to the target weight value within preset allowable limits, to discharge the articles from the weighing hoppers of the weighing machines corresponding to the optimum combination (whereby these weighing hoppers are left empty), to resupply the emptied weighing hoppers of these weighing machines with articles in order to prepare for the next weighing cycle, and to repeat the foregoing steps in similar fashion to carry out a continuous automatic weighing operation.

The load cell and amplifier mentioned above have characteristics that vary with temperature. Therefore, unless certain measures are taken, the weight signal output from the weighing machine fluctuates due to a change in zero point and span settings, thereby making it impossible to maintain good weighing precision. Accordingly, in the prior art, a variable resistor for zero-point and span adjustment is provided for each and every weighing machine, and each resistor is controlled manually to compensate for the change in zero point and span ascribable to variation in the characteristics of the load cell and amplifier. However, since this conventional zero-point and span adjustment is performed by manual control of the variable resistors, adjustment requires considerable time and effort, particularly when there are a large number of weighing machines. The present applicant has proposed a method of automatically adjusting zero point in copending application Ser. No. 605,376 filed Apr. 27, 1984. The present invention is directed to a system for span adjustment.

SUMMARY OF THE INVENTION

Accordingly, an object of the present invention is to provide a span adjusting method and apparatus for performing a span adjustment automatically.

Another object of the present invention is to provide a span adjusting method and apparatus through which a span adjustment can be performed in a short period of time.

A further object of the present invention is to provide a span adjusting method and apparatus through which a highly precise weighing operation can be performed.

According to the present invention, the foregoing objects are attained by providing a span adjustment method which includes applying a known load to a weighing machine, converting an output value from the weighing machine into a digital value by an analog-to-digital converter, and effecting an adjustment so that the digital value resulting from the analog-to-digital conversion becomes a digital value set in the control unit and conforming to the known load. The control unit produces a span value in the form of a digital value, a digital-to-analog converter converts the digital span value into an analog value, and the characteristic of the analog-to-digital converter is changed by the analog value resulting from the digital-to-analog conversion. After the characteristic is changed, the control unit compares the output digital value from the analog-to-digital converter and the digital value conforming to the known load, and sequentially changes the span adjustment value in accordance with the relative sizes of the compared digital values, whereby the output digital value from the analog-to-digital converter becomes a value conforming to the known load.

Other features and advantages of the present invention will be apparent from the following description taken in conjunction with the accompanying drawings, in which like reference characters designate the same or similar parts throughout the figures thereof.

DESCRIPTION OF THE PREFERRED EMBODIMENT

Figure 1:
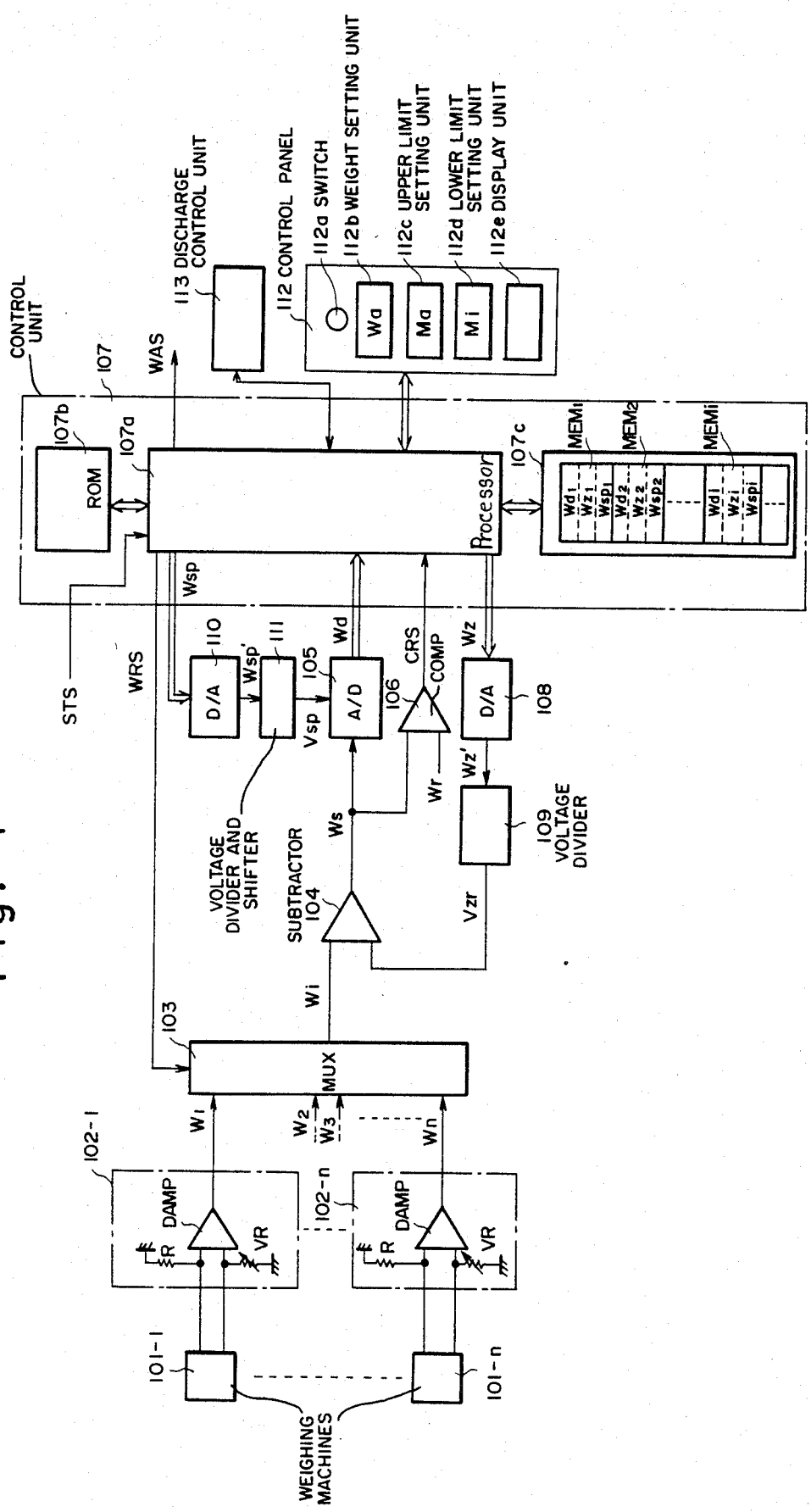
FIG. 1 is a block diagram of an embodiment of an apparatus for practicing the span adjusting method of the present invention.
Figure 2:
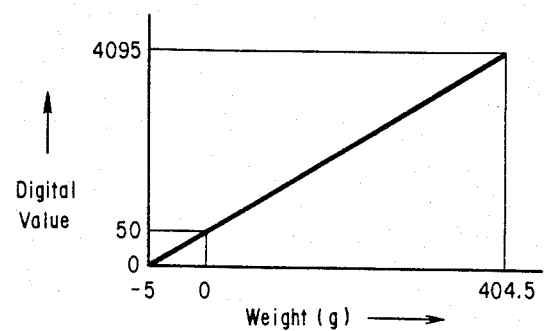
FIG. 2 is a graph of the corresponding relation between the digital value of an output signal, which is produced by an AD converter in the apparatus of FIG. 1, and weight in grams.

Reference will first be had to FIG. 1, which illustrates an apparatus for practicing the span adjusting method of the present invention. Numerals 101-1 . . . 101-n denote n-number of weighing machines each of which comprises a weight sensor and a weighing hopper, (not shown). Numerals 102-1 . . . 102-n denote n-number of amplifiers each of which has its input side connected to output terminals of a corresponding one of the weighing machines, each amplifier having a differential amplifier DAMP, a resistor R and a variable resistor VR. The method of adjusting the variable resistor VR is described below. The amplifiers 102-1 . . . 102-n produce respective output signals having values W1 . . . Wn indicative of the amplified weight signals obtained from the weighing machines. A multiplexer 103, comprising an analog switch or the like, receives the weight values Wi (i=1, 2 . . . n) from the amplifiers and delivers these as output signals in successive fashion in response to a weight value read signal WRS, described below. A subtractor 104 calculates the difference Ws between each weight value Wi received from the multiplexer 103, and a zero-point correction voltage Vzr produced by a voltage divider 109. A sequential comparison-type AD converter 105 converts the difference Ws, which is an analog voltage, into a 12-bit digital value Wd. It should be noted that the difference Ws has a value ranging between 0 v and approximately 11 v, and that the digital value Wd ranges between 0 and 4095. The arrangement is such that one digit of the digital value Wd from the AD converter 105 is equivalent to 0.1 g, with a digital value of 0 corresponding to -5 g, a digital value of 50 to 0 g, and a digital value of 4095 to 404.5 g, as shown in FIG. 2. A comparator 106 compares the magnitude of a preset value Wr with that of the difference Ws produced by the subtractor 104, and generates a signal CRS having a value of logical "1", when Ws>Wr is found to hold. The value Wr is preset to, e.g., 0.12 v, which is equivalent to an output value of approximately 50 from the AD converter 105.

Figure 3:
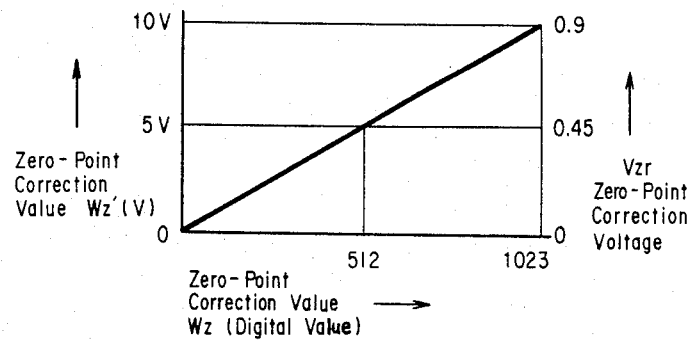
FIG. 3 is a graph of the corresponding relation between the digital value of an input signal, which is applied to a zero-adjustment DA converter in the apparatus of FIG. 1, and the output voltage of the DA converter.
Figure 4:
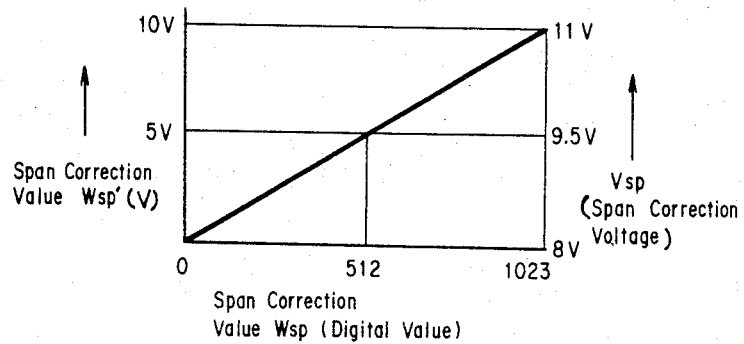
FIG. 4 is a graph of the relation between the inputs and outputs of a span adjustment DA converter in the apparatus of FIG. 1.

Numeral 107 denotes a control unit comprising a processor 107a for executing processing in accordance with a processing program, a ROM (read-only memory) 107b which stores the processing program, which is for executing span adjustment, automatic zero-point adjustment and combinatorial processing, and a RAM (random-access memory) for the writing and reading of data. The control unit 107 produces a zero-point correction value Wz, which is a 10-bit digital value, and applies the value to a zero-point correction DA converter 108, where the value Wz is converted into a voltage, namely an analog zero-point correction value Wz'. The relation between Wz and Wz' is as shown in FIG. 3. Specifically, the DA converter 108 subjects the digital value Wz to a DA conversion in such a manner that digital values of 1023 and 0 are made equivalent to 10 v and 0 v, respectively, and in such a manner that the output voltage Wz' is made proportional to the input Wz. The output voltage Wz' is applied to the aforementioned voltage divider 109, which is for effecting a level adjustment by dividing the output voltage Wz' of the DA converter 108 by 11 to produce a zero-point correction voltage Vzr. The control unit 107 also produces a span adjustment value Wsp, which is a 10-bit digital value, and applies the value to a span adjustment DA converter 110, where the value Wsp is converted into a voltage, namely an analog span adjustment value Wsp'. The relation between Wsp and Wsp' is as shown in FIG. 4. Specifically, the DA converter 110 subjects the digital value Wsp to a DA conversion in such a manner that digital values of 1023 and 0 are equivalent to 10 v and 0 v, respectively, and in such a manner that the output voltage Wsp' is proportional to the input Wsp. The output voltage Wsp' is applied to a voltage divider and shifter 111, which in effect multiplies Wsp' by 3/10 and then adds 8 v to the divided voltage output thereof to produce a span adjustment voltage Vsp. The latter is applied to the AD converter 105.

Numeral 112 denotes a control panel including a switch 112a for requesting execution of a zero-point or span adjustment, a weight setting unit 112b for setting a target weight value Wa, an upper limiting setting unit 112c, a lower limit setting unit 112d, and a display unit 112e. The upper and lower limit setting units 112c, 112d are for setting upper and lower (maximum and minimum) limit values Ma, Mi, respectively, of an allowable range desired for the total weight of a combination. Numeral 113 designates a discharge control unit.

Figure 5:
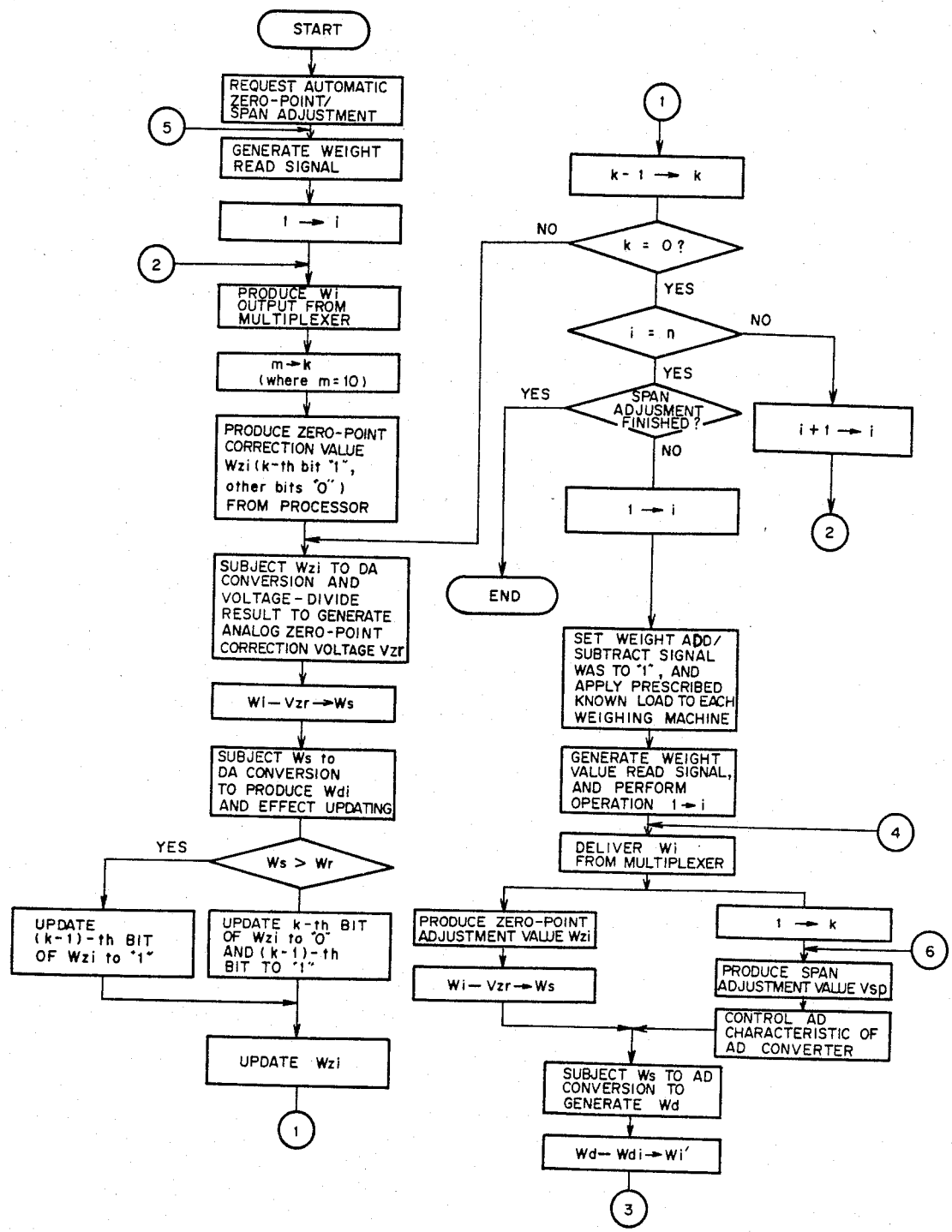
FIGS. 5A and 5B are flowcharts for the processing for zero-point/span adjustment.
Figure 5:
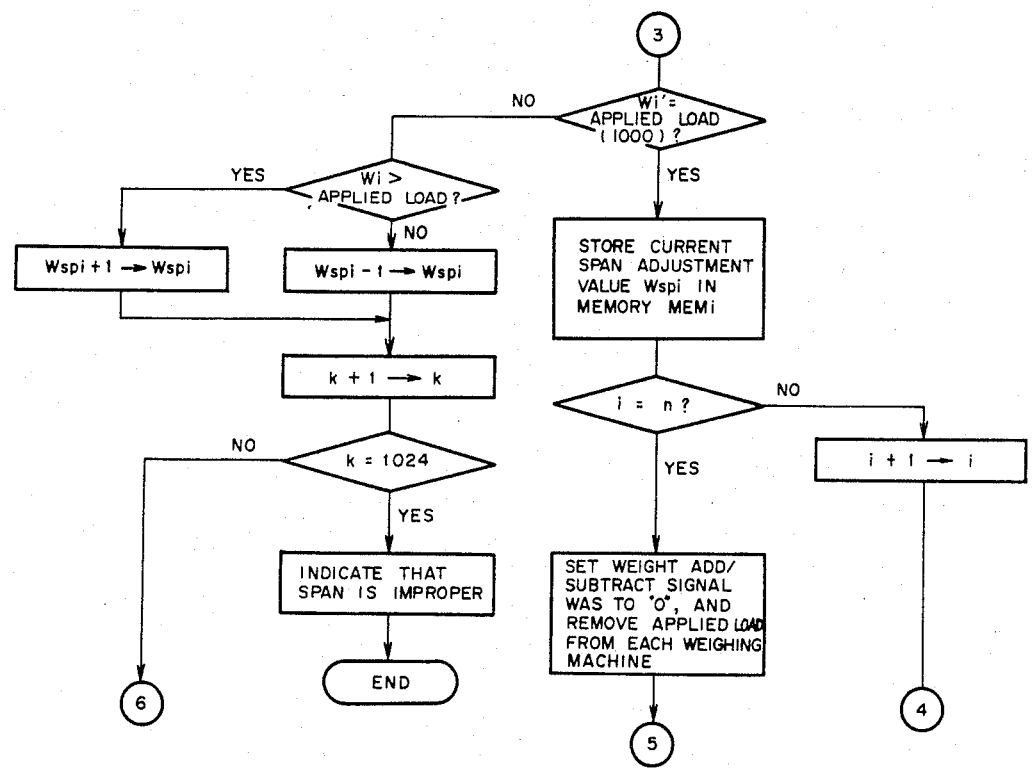

Reference will now be had to the flowcharts of FIGS. 5(A), (B) to describe an automatic span adjustment performed by the apparatus of FIG. 1. We will assume that the variable resistors VR of the amplifiers 102-1 through 102-n, corresponding to the weighing machines 101-1 through 101-n, are to be adjusted at the time that the combinatorial weighing system is installed on-site, and that the adjustment is to be performed, while viewing the display on the display unit 110e of the control panel 110, in such a manner that the zero-point adjustment value Wz (a 10-bit digital value) for each weighing machine takes on a value of 512 (i.e., in such a manner that an output of 0.45 v is produced by the voltage divider 109) when the weighing machines are free of an applied load. This is to effect a conversion into a digital value and make possible a zero-point adjustment with respect to a digital value of 512 even if the zero point should deviate in the positive or minus direction.

(1) The operator leaves the weighing machines unloaded and presses the switch 112a on the control panel 112 to request an automatic zero-point adjustment/span adjustment of the control unit 107.

(2) When the switch 110a is pressed, the processor 107a delivers the weight value read signal WRS to the multiplexer 103. The latter responds by successively delivering unloaded weight signals W1, W2 . . . Wn received from the respective weighing machines 101-1 . . . 101-n via the amplifiers 102-i (i=1, 2 . . . n). The following description will relate to a particular weight value Wi produced as an output by the multiplexer 103.

(3) Under the control of the zero-point adjustment processing program stored in the ROM 107b, the processor 107a delivers the value 512 in the form of a 10-bit binary numerical value of which only the tenth bit is "1", the first through ninth bits being "0". The value 512 serves as a zero-point correction value (that is, a zero-point correction value Wzi with respect to the weight value Wi). This value is stored in the RAM 107c at a storage area MEMi corresponding to the weighing machine 101-i which has produced the weight value Wi as its output. This initial zero-point correction value (first digital value) 512 (=1000000000) is converted into a voltage, or analog signal, by the DA converter 108, and the voltage is divided by the voltage divider 109 to produce the signal Vzr, which is applied to one input terminal of the subtractor 104.

(4) Applied to the other input terminal of the subtractor 104 is the weight value Wi from the weighing machine 101-i, which is in the unloaded state. The subtractor 104 therefore performs the following operation to calculate the difference Ws and produce an output signal indicative thereof:

$$Wi - Vzr \rightarrow Ws \qquad (1)$$

(5) The difference Ws is applied to the comparator 106, and is converted by the AD converter 105 into a digital value Wd, which is read in by the processor 107a and stored thereby as Wdi in the storage area MEMi of the RAM 107c.

(6) The comparator 106, which compares the difference Ws and the preset value Wr in magnitude, produces a logical "1" output when Ws>Wr holds, and a logical "0" output when Ws≦Wr holds.

(7) The processor 107a discriminates the output of the comparator 106, namely the logic level of the output signal CRS produced thereby. If CRS is logical "1" (i.e., Ws>Wr), the ninth bit of the first digital value Wzi is changed to logical "1" (i.e., 1000000000→1100000000); if CRS is logical "0" (i.e., Ws≦Wr), then the tenth bit of the first digital value is changed to logical "0" and the ninth bit is changed to logical "1" (i.e., 1000000000→0100000000). In either case, the resulting digital value, namely a second digital value 768 (=1100000000) or 256 (=0100000000) is produced by the processor 107a as the zero-point correction value Wz. The processor 107a also uses this second digital value to update the zero-point correction value Wzi stored in the storage area MEMi of the RAM 107c. The updated zero-point correction value Wz is applied to the subtractor 104 through the DA converter 108 and voltage divider 109.

(8) Thereafter, via the foregoing steps (4) through (6), the difference Ws is calculated, Ws is converted into a digital value, the digital value Wdi stored in the storage area MEMi of the RAM 107c is updated, and the magnitude of the difference Ws is compared with the magnitude of the preset value Wr.

(9) If the signal CRS produced by the comparator 106 is logical "1" (Ws>Wr), the processor 107a changes the eighth bit of the second digital value to "1". If CRS is logical "0" (Ws≦Wr), the ninth bit of the second digital value is changed to "0" and the eighth bit to "1". In either case, the result is a third digital value delivered as a new zero-point correction value Wz. The processor 107a uses this third digital value of update the zero-point correction value Wzi stored in the storage area MEMi of the RAM 107c.

By performing the foregoing steps in the manner described above, the apparatus repeats the processing for calculating the difference Ws, converting the difference into a digital value and comparing the difference Ws and the preset value, as well as the processing for altering the zero-point correction value Wzi based on the result of the comparison step (which is processing similar to the AD conversion processing performed by a sequential-type AD converter). The foregoing process steps are repeated until the first bit of the zero-point correction value is specified, whereby the zero-point correction value Wzi is finally determined. At the instant the zero-point correction value Wzi is delivered by the processor 107a, the difference Ws produced by the subtractor 104 is equal, or nearly equal, to the preset value Wr. It should be noted that the finally determined zero-point correction value (Wzi), and the output (Wdi) of the AD converter 105 that prevails when this zero-point correction value (Wzi) is produced, are stored in the storage area MEMi of the RAM 107c.

(10) Thereafter, through the foregoing process steps, the zero-point correction values Wzi (i=1, 2... n) and AD converter outputs Wdi (i=1, 2... n) for all of the weighing machines 101-1 through 101-n are obtained and stored in the RAM 107c. When this has been accomplished, zero-point adjustment processing ends.

(11) When zero-point adjustment processing ends, the processor 107a delivers a weight add/subtract signal WAS (="1") to each of the weighing machines 101-1 through 101-n, in response to which actuators (not shown), which are attached to respective ones of the weighing machines, are driven to apply a load of, e.g., 100 g thereto. It should be noted that the load of 100 g is applied to a weighing machine when the weight add/subtract signal WAS goes to logical "1". When the signal WAS goes from logical "1" to logical "0", the load of 100 g is removed from the weighing machine.

(12) The processor 107a delivers the weight value read signal WRS to the multiplexer 103, which responds by delivering the weight value W1 produced by the weighing machine 101-1.

(13) The processor 107a then goes to the storage area MEM1 of the RAM 107c to read out a zero-point correction value Wz1 for the weighing machine 101-1, which value was obtained through steps (1) through (10). The processor delivers this value to the DA converter 108, which is for zero-point adjustment. The processor 107a also goes to the RAM 107c to read out a span correction value Wsp1 for the weighing machine 101-1 (which value is the result of an immediately previous span adjustment), and delivers this value to the DA converter 110, which is for span adjustment.

(14) Using W1 and the analog zero-point correction voltage Vzr, the subtractor 104 performs the following operation to generate the difference Ws:

$$W1 - Vzr \rightarrow Ws \qquad (2)$$

(15) Meanwhile, a span adjustment value Wsp is converted into an analog voltage by the DA converter 110, which voltage is subsequently voltage-divided and shifted by the voltage divider and shifter 111 to produce a span adjustment voltage (reference voltage) Vsp. This is applied to the AD converter 105 to change the characteristic thereof.

(16) With the span adjustment voltage Vsp applied thereto, the AD converter 105 subjects the difference Ws, which is the result of performing Eq. (2), to an analog-to-digital conversion.

(17) Using the digital value Wd and the digital value Wd1, which has been obtained and stored in the storage area MEM1 of the RAM 107c due to the above-described zero-point adjustment processing of steps (1) through (10), the processor 107a performs the following operation:

$$Wd - Wd1 \rightarrow W1' \qquad (3)$$

to calculate the weight W1' which prevails when a span adjustment is performed in accordance with the immediately preceding span adjustment value.

(18) When the weight W1' has been obtained, the processor 107a decides whether the weight W1' is equal to a digital value (=1000), which is equivalent to the load (the weight of the applied load) of 100 g. If the result of the decision is affirmative, then the currently prevailing span adjustment value is stored as Wsp1 in the storage area of the RAM 107c.

(19) If W1' is not equal to the applied weight of 1000, the processor 107a renders a decision concerning the relative size thereof.

(20) If the relative voltage applied to the sequential comparison-type AD converter 105 is raised, the output (digital value) of the converter is decreased. Therefore, if W1'>1000 holds, the currently prevailing span adjustment value is updated in accordance with the following formula:

$$Wsp1 + 1 \rightarrow Wsp1$$

If W1'<1000 holds, then the currently prevailing span adjustment value is updated in accordance with the following formula:

$$Wsp1 - 1 \rightarrow Wsp1$$

(21) When the updating of the span adjustment value ends, the processor 107a performs the operation $k+1 \rightarrow k$ (where the initial value of k is 1). Thereafter, the processor delivers the updated span adjustment value Wspi to the DA converter 110.

(22) The processor 107a thenceforth repeats steps (14) through (21) until the condition W1'=1000 is achieved (or until the relative size relationship between W1' and 1000 reverses itself), or until the condition k=1024 is achieved. If W1'=1000 holds, the foregoing span adjustment processing is executed for the weighing machine 101-2. Thenceforth, and in the manner described above, span adjustment processing according to steps (12) through (21) is performed until span adjustment values Wspi (i=1, 2... n) are obtained for all of the weighing machines. If the condition W1'=1000 is not achieved even though k=1024 is found to hold in the process for obtaining a span adjustment value for each weighing machine, an improper span indication is given by a buzzer or lamp, and the foregoing process is terminated.

(23) When the span adjustment values Wspi (i=1, 2... n) are found for all weighing machines, the processor 107a sets the weight add/subtract signal WAS to "0" to remove the load of 100 g from each weighing machine.

(24) The processor 107a re-executes a zero-point adjustment for all weighing machines through steps (2) through (10) and ends the zero-point and span adjustment processing.

Figure 6:
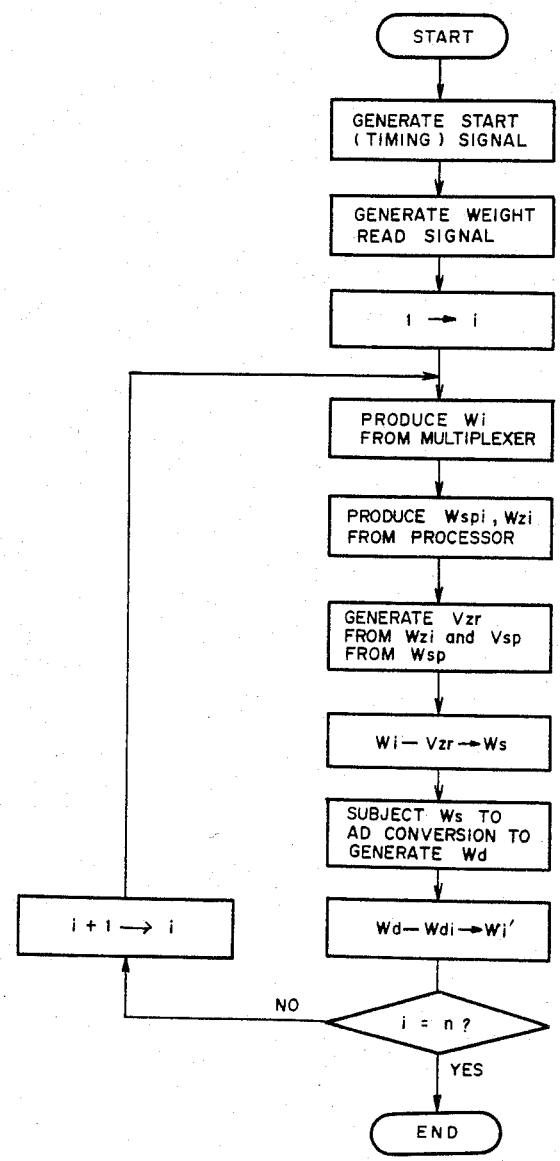
FIG. 6 is a flowchart for the processing for weight measurement.

Upon the completion of zero-point and span adjustment processing, articles are introduced into the weighing machines 101-1 through 101-n and a start signal (timing signal) STS is produced by a packaging machine, which is not shown. The control unit 107 responds to the signal STS by executing processing in accordance with the flowchart of FIG. 6 to measure the weight of the articles in each weighing machine. The process steps are as follows:

(a) When the start signal STS is generated, the processor 107a produces the weight value read signal WRS and applies the signal WRS to the multiplexer 103. The multiplexer 103 responds to the arrival of the weight value read signal WRS by delivering the weight value W1 produced by the weighing machine 101-1.

(b) Next, the processor 107a supplies the zero-point adjustment DA converter 108 with the zero-point correction value Wz1 for the weighing machine 101-1, and supplies the span adjustment DA converter 110 with the span adjustment value Wsp1 for the weighing machine 101-1, these values being obtained from the storage area MEM1 of the RAM 107c.

(c) Using W1, which is a weight value obtained from the multiplexer 103, and the analog zero-point correction voltage Vzr produced by the voltage divider 109, the subtractor 104 generates the difference Ws by performing the operation of Eq. (2), namely:

$$W1 - Vzr \rightarrow Ws$$

With a span adjustment voltage (reference voltage) Vsp conforming to the span adjustment value Wsp1 applied thereto, the AD converter 105 subjects the difference Ws to an AD conversion and applies the resulting digital value Wd to the processor 107a.

(d) Using the digital value Wd and the digital value Wd1, which has been stored in the storage area MEM1 of the RAM 107c due to the above-described zero-point adjustment processing, the processor 107a performs the operation of Eq. (3), namely:

$$Wd - Wd1 \rightarrow W1'$$

to calculate the weight W1' of the articles introduced into the weighing machine 101-1. The processor then stores W1' in the RAM 107c.

(e) When calculation of the true weight W1' of the articles contained in the weighing machine 101-1 is completed, the multiplexer 103 delivers the weight value W2 received from the weighing machine 101-2 via the amplifier 102-2, and the processor 107a supplies the DA converter 108 with the zero-point correction value Wz2 for the weighing machine 101-2, and supplies the DA converter 110 with the span adjustment value Wsp2 for the weighing machine 101-2, these values being obtained from the storage area MEM2 of the RAM 107c.

The processor 107a then repeats steps (c) and (d) to calculate the weight W2' of the articles contained in the weighing machine 102-2 and to store W2' in the RAM 107c.

Thereafter, the control unit 107 calculates the weight values Wi' (i=1, 2... n) of the articles contained in all of the weighing machines, executes well-known combinatorial processing following completion of the foregoing calculations, calculates the total weight of each of the combinations obtained, finds an optimum combination, namely a combination whose total weight value is equal to the target weight value Wa or closest to the target weight value Wa within preset allowable limits (i.e., between Mi and Ma), and sends a discharge signal to the discharge control unit 113 to discharge the articles from the weighing machines corresponding to the optimum combination.

It should be noted that an arrangement is possible wherein the number of a weighing machine is designated by numeric keys or the like to perform the above-described span adjustment solely for the weighing machine having the designated number.

In the case described above, the present invention is applied to span adjustment of the weighing machines constituting a combinatorial weighing system. However, it goes without saying that the invention is not limited to such application but can be modified in various ways within the scope of the claims.

What we claim is:

1. A span adjustment method for applying a known load to a weighing machine which produces an analog output, and effecting an adjustment so that a true weight value, in the form of a digital value conforming to the known load, is obtained, said method comprising the steps of:

(a) producing a digital span adjustment value;
   (b) converting the digital span adjustment value into an analog span adjustment value;
   (c) converting the analog output of the weighing machine into a digital output value using an analog-to-digital converter, and comparing the digital output value and the digital value conforming to the known load, while changing a conversion characteristic of the analog-to-digital converter in accordance with the analog span adjustment value; and
   (d) sequentially changing the digital span adjustment value, in accordance with the relative sizes of the compared digital values, to obtain a true weight value, which conforms to the known load, as the digital output value produced as an output by the analog-to-digital converter.

2. A span adjustment apparatus for applying a known load to a weighing machine which produces an analog output, and effecting an adjustment so that a true weight value, in the form of a digital value conforming to the known load, is obtained, said apparatus comprising:

an analog-to-digital converter, operatively connected to the weighing machine and having a variable analog-to-digital conversion characteristic, for converting the analog output of the weighing machine into a digital output value;
   first means for storing a span adjustment value for adjusting the variable analog-to-digital conversion characteristic of said analog-to-digital converter;
   second means for storing the digital value conforming to the known load;
   comparison means, operatively connected to said second means and said analog-to-digital converter, for comparing the digital value conforming to the known load and the digital output value from said analog-to-digital converter; and
   means, operatively connected to said first means and said comparison means, for sequentially changing the span adjustment value in accordance with the relative sizes of the digital values compared by said comparison means to obtain a true weight value, which conforms to the known load, as the digital output value from said analog-to-digital converter.

3. The apparatus according to claim 2, wherein said first means includes means for storing the span adjustment value which prevails when the digital output value from said analog-to-digital converter has been adjusted to the true weight value conforming to the known load by said changing means and wherein the stored span adjustment value serves as an initial span adjustment value when the next span adjustment operation is performed.

4. The apparatus according to claim 2, wherein said analog-to-digital converter is operatively connected to a plurality of said weighing machines arranged to form a combinatorial weighing system, wherein said sequential changing means includes means for performing a span adjustment operation for all of said weighing machines in response to a span adjustment request, to obtain a span adjustment value corresponding to each weighing machine, wherein said first means includes means for storing the span adjustment values, further comprising a control unit, operatively connected to the weighing machines, for reading the analog output from one of the weighing machines, wherein the variable characteristic of said analog-to-digital converter is changed by the stored span adjustment value corresponding to said one of the weighing machines.

5. The apparatus according to claim 2, wherein said analog-to-digital converter is operatively connected to a plurality of said weighing machines arranged to form a combinatorial weighing system, wherein said sequential changing means includes means for performing a span adjustment operation for at least one of said plurality of weighing machines in response to a span adjustment request, to obtain a span adjustment value, wherein said first means includes means for storing the span adjustment value, further comprising a control unit, operatively connected to the weighing machines, for reading the analog output from said at least one weighing machine, wherein the variable characteristic of said analog-to-digital converter is changed by the stored span adjustment value corresponding to said at least one weighing machine.

6. A span adjustment apparatus for applying a known load to a weighing machine which produces an analog weight signal and effecting an adjustment so that a true weight value, in the form of a digital value conforming to the known load, is obtained, said apparatus comprising:

a sequential comparison-type analog-to-digital converter, operatively connected to the weighing machine, for converting the analog weight signal into a digital weight value;
   a control unit, operatively connected to said sequential comparison type analog-to-digital converter, for comparing the digital weight value produced as an output by said sequential comparison type analog-to-digital converter, and the digital value conforming to the known load, for varying a span adjustment value in accordance with the relative sizes of the compared digital values, and for providing the varied span adjustment value in the form of a digital span adjustment value;
   a span adjustment digital-to-analog converter, operatively connected to said control unit, for converting the digital span adjustment value provided by said control unit into an analog span adjustment value; and
   voltage dividing and shifting means, operatively connected to said span adjustment digital-to-analog converter and said sequential comparison type analog-to-digital converter, for dividing the voltage of the analog span adjustment value output by said span adjustment digital-to-analog converter, for adding a predetermined voltage to the divided analog span adjustment output voltage and for delivering the result as an analog span adjustment voltage to said sequential comparison type analog-to-digital converter.

7. A span adjustment method for use with a weighing machine which produces an analog weight value in dependence upon the load thereon, comprising the steps of:

(a) applying a load having a predetermined weight value corresponding to a predetermined digital value to the weighing machine;

(b) providing a digital span adjustment value having an initial value;

(c) converting the digital span adjustment value into an analog span adjustment value;

(d) converting the analog weight value to a digital output value in dependence upon a conversion characteristic which is varied in accordance with the analog span adjustment value;

(e) comparing the digital output value to the predetermined digital value;

(f) adjusting the digital span adjustment value to vary the conversion characteristic used in said step (d); and (g) repeating said steps (c) through (f) until the digital output value is equal to the predetermined digital value or until said comparing step (e) has taken place k times, where k is an integer greater than one.

8. The method according to claim 7, further comprising the step of storing the adjusted digital span adjustment value after completing said step (g).

9. The method according to claim 8, wherein said step (f) comprises adding a predetermined value to the digital span adjustment value when it is determined in said step (e) that the digital output value is greater than the predetermined digital value, and subtracting a predetermined value from the digital span adjustment value when it is determined in said step (e) that the digital output value is less than the predetermined digital value.

10. The method according to claim 7, wherein said step (f) comprises adding a predetermined value to the digital span adjustment value when it is determined in said step (e) that the digital output value is greater than the predetermined digital value, and subtracting a predetermined value from the digital span adjustment value when it is determined in said step (e) that the digital output value is less than the predetermined digital value.

* * * * *

UNITED STATES PATENT AND TRADEMARK OFFICE
CERTIFICATE OF CORRECTION

PATENT NO. : 4,535,857
DATED : August 20, 1985
INVENTOR(S) : SETSUO HAZE

It is certified that error appears in the above-identified patent and that said Letters Patent is hereby corrected as shown below:

Col. 3, line 9, "hopper," should be --hopper--.

Col. 9, line 42, " ' characteristic" should be

--characteristic--.

Signed and Sealed this

Twenty-second Day of October 1985

[SEAL]

Attest:

DONALD J. QUIGG

Attesting Officer

Commissioner of Patents and
Trademarks—Designate